United States Patent [19]

Kieser et al.

[11] Patent Number: 4,814,020

[45] Date of Patent: Mar. 21, 1989

[54] READILY DISPERSIBLE NACREOUS PIGMENT PREPARATION

[75] Inventors: Manfred Kieser; Otto Stahlecker, both of Darmstadt, Fed. Rep. of Germany

[73] Assignee: Merck Patent Gesellschaft mit beschränkter Haftung, Darmstadt, Fed. Rep. of Germany

[21] Appl. No.: 84,235

[22] Filed: Aug. 11, 1987

[30] Foreign Application Priority Data

Aug. 12, 1986 [DE] Fed. Rep. of Germany ....... 3627329

[51] Int. Cl.$^4$ .......................... C08K 5/01; C04B 14/20
[52] U.S. Cl. .................................... 106/499; 106/417; 428/363; 428/407
[58] Field of Search ................... 106/291, 308 M, 417, 106/499; 428/363, 407

[56] References Cited

U.S. PATENT DOCUMENTS

| | | | |
|---|---|---|---|
| 3,819,566 | 6/1974 | Pinsky et al. | 106/291 |
| 4,180,609 | 12/1979 | Vassiliou | 428/363 |
| 4,205,997 | 6/1980 | Hesse et al. | 106/291 |
| 4,499,143 | 2/1985 | Panush | 106/291 |

*Primary Examiner*—Paul Lieberman
*Assistant Examiner*—Christine A. Skane
*Attorney, Agent, or Firm*—Millen & White

[57] ABSTRACT

The invention relates to pigment preparations, in which a platelet-shaped nacreous pigment is coated with a polymer resin and, if appropriate, plasticizers, solvents and surfactants.

12 Claims, No Drawings

READILY DISPERSIBLE NACREOUS PIGMENT PREPARATION

BACKGROUND OF THE INVENTION

The invention relates to a pigment preparation in which a platelet-shaped nacreous pigment is coated with a polymer resin and, if appropriate, plasticizers, solvents and surfactants.

Because of their platelet-shaped structure, nacreous pigments cannot be dispersed like conventional pigments under the action of highshearing forces, since the pigment platelets are thereby crushed and the nacreous luster is thus reduced or even destroyed completely.

Various attempts have therefore been made to solve the problem of incorporation of nacreous pigments, in particular into thermoplastics. Bismuth oxychloride and basic lead carbonate are therefore as a rule used in the already pre-dispersed form as a paste. In the case of metal oxide/mica pigments, however, such pastes can be prepared only with up to a maximum of 40-45% by weight of pigment.

It is known from German Offenlegungsschrift No. 2,603,211 that the pigment particles can be brought into a pre-dispersed form by encasing in a solid polymer which dissolves in the medium in which the pigment is to be dispersed. This casing must be applied, however, in a relatively complicated process.

A liquid adhesive with which the polymer granules are wet before being mixed with a pulverulent nacreous pigment is known from German Offenlegungsschrift No. 3,221,044. However, only the problems which arise during coloring of plastic in granule form are solved by this process, and the process is still too complicated for the user.

SUMMARY OF THE INVENTION

It is therefore an object of the invention to provide a pigment preparation which allows direct incorporation of a pulverulent nacreous pigment into plastics without additional process steps being necessary.

Upon further study of the specification and appended claims, further objects and advantages of this invention will become apparent to those skilled in the art.

These objects have been achieved by the present invention. In particular, it has been found that by applying a liquid mixture of a polymer with solvents, plasticizers and, if appropriate, surfactants to a nacreous pigment, a pulverulent, non-dusting nacreous pigment preparation is obtained which has a very good dispersibility and an improved interaction between the pigment and binder, which means that a significantly improved distribution of the pigment is achieved and there is a reduced tendency towards so-called "plate out".

The invention therefore relates to a pigment preparation in which a platelet-shaped nacreous pigment is coated with a polymer resin and, if appropriate, plasticizers, solvents and surfactants, which is characterized in that the preparation contains 0.2-30% by weight of a mixture of 2 to 50% by weight of a polyester/polyurethane block copolymer with tertiary amino groups, 0 to 75% by weight of a plasticizer or plasticizer mixture, 0 to 75% by weight of a solvent or solvent mixture and 0 to 10% by weight of a surfactant and 99.8-70% by weight of pigment. The sum of percentages of the mentioned mixture components is 100%.

The invention also relates to a process for the preparation of a pulverulent, readily dispersible nacreous pigment preparation, which is characterized in that the nacreous pigment is wet, with slow agitation, with 0.2 to 30% by weight (based on the total weight of preparation) of a mixture of 2 to 50% by weight of a polyester/polyurethane block copolymer with tertiary amino groups, 0 to 75% by weight of a solvent or solvent mixture, 0 to 75% by weight of plasticizer and 0 to 10% by weight of a surfactant, the solvent is removed, if appropriate, with further agitation of the pigment, and, if appropriate the pulverulent free-flowing nacreous pigment preparation is sieved. Agitation during solvent removal accelerates the process and prevents the pigment particles from sticking together. Any agglomerates that are formed can, however, be easily removed by sieving the preparation.

Nacreous pigments which are used in the preparations according to the invention are, in particular, mica flake pigments coated with metal oxides. These pigments are known, for example, from German Patents and patent application Nos. 1,467,468, 1,959,998, 2,009,566, 2,214,545, 2,215,191, 2,244,298, 2,313,331, 2,522,572, 3,137,808, 3,137,809, 3,151,343, 3,151,354, 3,151,355, 3,211,602 and 3,235,017. Especially preferred pigments include those based on mica flakes coated with titanium dioxide, iron oxide, or a mixture thereof.

An essential constituent of the coating agent is a polymeric resin with groups with an affinity for the pigment, this being applied to the pigment in an amount of about 2 to 50% by weight, in particular about 5 to 25% by weight. A polyester/polyurethane block copolymer with tertiary amino groups which has a density of about 0.90-1.10 g/cm$^3$ and an amine number of 10-28 mg of KOH per g is preferably used as the resin.

If appropriate, customary plasticizers, such as, for example, phthalates, adipates and polymer plasticizers, can additionally also be added in amounts of 0 to 75% by weight, preferably about 20 to 40% by weight, as well as, if appropriate, 0 to 10% by weight, preferably about 0.5 to about 2.5% by weight, of a surfactant.

Plasticizers which can be used are, for example, phthalic acid esters of linear, branched or cyclic alcohols with up to 12 C atoms, as well as esters of adipic, sebacic or azelaic acid, saturated or unsaturated fatty acid esters and citric acid esters with the same alcohols. Other suitable plasticizers are described, for example, in Kirk-Othmer, Volume 15, pages 720-789. Possible surfactants are in principle all the anionic, cationic, ampholytic and non-ionic surfactants.

To aid in the application of the coating agent to the pigment, if appropriate a solvent, such as, for example, esters, alcohols, ethers and aromatics, preferably having a molecular weight of up to about 200, is added to the polymer and the other constituents.

The coating agent is applied to the pigment by simple mixing, for example in a tumble mixer, paddle mixer or fluid mixer, slow-running mixers being preferred because of the relatively high susceptibility of the pigments to fracture. After the starting pigments have been coated with the coating agent and, if appropriate, the solvent has been removed, the pigment preparation can be sieved. The nacreous pigment preparation can then be incorporated directly into the thermoplastic polymers without further pretreatment Without further elaboration, it is believed that one skilled in the art can, using the preceding description; utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight The entire text of all applications, patents and publications, if any, cited above and below are hereby incorporated by reference.

EXAMPLE 1

85 g of Iriodin ® silver nacreous luster (mica flake pigment coated with titanium dioxide, from E. Merck, Darmstadt, with a particle size distribution of 10-60 um) are mixed with 15 g of a solution of 3.6 parts of a polyester/polyurethane block copolymer with tertiary amino groups (non-volatile content of Disperbyk ®-163 marketed by Byk-Chemie), 3.5 parts of dibutyl phthalate, 3.5 parts of butyl glycolate, 0.88 part of butyl acetate, 0.88 part of methoxypropyl acetate and 2.64 parts of xylene in a paddle mixer. A virtually dust-free product which is still readily freeflowing and on incorporation into thermoplastics shows a very good compatibility with the plastic is obtained.

EXAMPLE 2

80 g of Iriodin ® 120 satin luster (mica flake pigment coated with titanium dioxide from E. Merck, Darmstadt, with a particle size distribution of 5-25 um) are mixed with 20 g of a solution of 1 part of a polyester/polyurethane block copolymer with tertiary amino groups (non-volatile content of Disperbyk ®-163 marketed by Byk-Chemie), 1 part of di-2-ethylhexyl adipate, 0.6 part of butyl acetate, 0.24 part of methoxypropyl acetate and 0.68 part of xylene in a paddle mixer. After sieving, an almost dust-free product which is still readily free-flowing and on incorporation into thermoplastics shows a very good compatibility with the plastic is obtained.

EXAMPLE 3

90 g of Iriodin ®300 gold nacreous luster (mica flake pigment coated with titanium dioxide and iron oxide, from E. Merck, Darmstadt, with a particle size distribution of 10-60 um) are mixed with 10 g of a solution of 5 parts of a polyester/polyurethane block copolymer with tertiary amino groups (non-volatile content of Disperbyk ®-163 marked by Byk-Chemie), 2 parts of butyl glycolate, 5 parts of butyl acetate, 1.2 parts of methoxypropyl acetate and 3.4 parts of xylene in a paddle mixer. After sieving, an almost dust-free product which is still readily free-flowing and on incorporation into thermoplastics shows a very good compatibility with the plastic is obtained.

EXAMPLE 4

95 g of Iriodin ®100 silver nacreous luster (mica flake pigment coated with titanium dioxide, from E. Merck, Darmstadt, with a particle size distribution for 10-60 um) are mixed with 15 g of a solution of 1 part of a polyester/polyurethane block copolymer with tertiary amino groups (non-volatile content of Disperbyk ®-163 marked by Byk-Chemie), 1 part of dibutyl phthalate, 0.08 part of Tween 80, 1 part of butyl glycolate, 1.00 part of butyl acetate, 0.24 part of methoxypropyl acetate and 0.68 part of xylene in a paddle mixer. When the solution is distributed uniformly over the surface of the pigment, the mixing operation is continued under a vacuum (0.01 bar) for some time to remove volatile substances (solvents). After sieving, an almost dust-free product which is still readily free-flowing and on incorporation into thermoplastics shows a very good compatibility with the plastic is obtained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A pulverulent nacreous pigment preparation, comprising 99.8-70% by weight of a platelet-shaped nacreous pigment coated with a 0.2-30% mixture comprising:
   (a) 2-50% of a polyester/polyurethane block copolymer having tertiary amino groups;
   (b) 0-75% by weight of plasticizer;
   (c) 0-75% by weight of a solvent; and
   (d) 0-10% by weight of a surfactant.

2. A pigment according to claim 1, wherein the nacreous pigment is a mica flake pigment coated with a metal oxide.

3. A pigment according to claim 2, wherein the metal oxide is titanium ioxide, iron oxide, or a mixture thereof.

4. A pigment according to claim 1, wherein the copolymer has a density of about 0.90-1.10 g/cm$^3$ and an amine number of 1-28 mg of KOH per gram.

5. A pigment according to claim 1, wherein the plasticizer is present and is an ester of phthalic acid, an ester of adipic acid or a polymer plasticizer.

6. A pigment according to claim 5, wherein the plasticizer is an ester of a linear, branched or cyclic $C_{1-12}$ alcohol and phthalic acid, adipic acid, sebacic acid, azelaic acid, citric acid or a fatty acid.

7. A pigment according to claim 6, wherein the plasticizer is dibutyl phthalate or di-2-ethylhexyl adipate.

8. A pigment according to claim 1, comprising 5-25% by weight of the copolymer, 20-40% by weight of the plasticizer, and 0.5-2.5% by weight of the surfactant.

9. A pigment according to claim 1, wherein the solvent is an ester, an alcohol, an ether or an aromatic compound and has a molecular weight of at most about 200.

10. A pigment according to claim 1, wherein the solvent is present and is butylglycolate, butyl acetate, methoxypropyl acetate or a mixture thereof.

11. In a thermoplastic composition containing a nacreous pigment, the improvement wherein the pigment is a pigment of claim 1.

12. A method of rendering a platelet-shaped nacreous pigment dispersible in a thermoplastic composition comrpising coating said pigment with 0.2-30% by weight of a mixture comprising:
   (a) 2-50% of a polyester/polyurethane block copolymer having tertiary amino groups;
   (b) 0-75% by weight of plasticizer;
   (c) 0-75% by weight of a solvent; and
   (d) 0-10% by weight of a surfactant.

* * * * *